(12) United States Patent
Ryu et al.

(10) Patent No.: US 10,700,319 B2
(45) Date of Patent: Jun. 30, 2020

(54) BATTERY MODULE INCLUDING STRAP-TYPE FRAME, AND FRAME ASSEMBLY THEREFOR

(71) Applicant: LG CHEM, LTD., Seoul (KR)

(72) Inventors: Jae-Uk Ryu, Daejeon (KR); Dal-Mo Kang, Daejeon (KR); Ji-Su Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 67 days.

(21) Appl. No.: 16/065,614

(22) PCT Filed: Aug. 9, 2017

(86) PCT No.: PCT/KR2017/008629
§ 371 (c)(1),
(2) Date: Jun. 22, 2018

(87) PCT Pub. No.: WO2018/030787
PCT Pub. Date: Feb. 15, 2018

(65) Prior Publication Data
US 2019/0305268 A1   Oct. 3, 2019

(30) Foreign Application Priority Data

Aug. 12, 2016  (KR) .................... 10-2016-0103084

(51) Int. Cl.
*H01M 2/10*       (2006.01)
*H01M 10/04*      (2006.01)

(52) U.S. Cl.
CPC .......... *H01M 2/1077* (2013.01); *H01M 2/10* (2013.01); *H01M 2/1022* (2013.01); *H01M 10/04* (2013.01)

(58) Field of Classification Search
None
See application file for complete search history.

(56) References Cited

U.S. PATENT DOCUMENTS

| | | |
|---|---|---|
| 5,366,827 A | 11/1994 | Belanger et al. |
| 5,890,606 A | 4/1999 | Kuipers |
| 8,932,749 B2 | 1/2015 | Lim |
| 9,083,029 B2 | 7/2015 | Lee et al. |
| 2008/0299453 A1 | 12/2008 | Shinyashiki et al. |
| 2011/0159336 A1 | 6/2011 | Ohkura et al. |
| 2012/0156527 A1 | 6/2012 | Kataoka |

(Continued)

FOREIGN PATENT DOCUMENTS

| | | |
|---|---|---|
| DE | 693 07 781 T2 | 8/1997 |
| JP | 2006-40696 A | 2/2006 |

(Continued)

OTHER PUBLICATIONS

International Search Report issued in PCT/KR2017/008629 (PCT/ISA/210), dated Nov. 24, 2017.

*Primary Examiner* — Jonathan G Leong
*Assistant Examiner* — Kirsten B Tysl
(74) *Attorney, Agent, or Firm* — Birch, Stewart, Kolasch & Birch, LLP

(57) ABSTRACT

The present disclosure provides a battery module including: at least one cell; and a frame assembly including a lower plate configured to support a lower end surface of the cell, a strap-shaped side plate perpendicularly extending from four corners of the lower plate and placed adjacent to an outermost side of the cell, and an upper plate coupled to an upper end of the side plate and configured to cover an upper portion of the cell.

6 Claims, 3 Drawing Sheets

(56) References Cited

U.S. PATENT DOCUMENTS

2013/0157112 A1   6/2013  Lim et al.
2014/0234691 A1   8/2014  Lee et al.
2014/0295235 A1  10/2014  Jung
2015/0064521 A1   3/2015  Watanabe et al.

FOREIGN PATENT DOCUMENTS

| | | |
|---|---|---|
| JP | 2011-151006 A | 8/2011 |
| JP | 2013-536980 A | 9/2013 |
| JP | 2013-222563 A | 10/2013 |
| JP | 2014-534597 A | 12/2014 |
| JP | 2015-22830 A | 2/2015 |
| KR | 10-2011-0073221 A | 6/2011 |
| KR | 10-1271883 B1 | 6/2013 |
| KR | 10-2014-01187634 A | 10/2014 |
| KR | 10-2015-0000090 A | 1/2015 |
| KR | 10-2015-0042463 A | 4/2015 |
| KR | 10-2015-0142790 A | 12/2015 |
| WO | WO 2011/027817 A1 | 3/2011 |

BATTERY MODULE INCLUDING STRAP-TYPE FRAME, AND FRAME ASSEMBLY THEREFOR

TECHNICAL FIELD

The present application claims priority to Korean Patent Application No. 10-2016-0103084 filed on Aug. 12, 2016 in the Republic of Korea, the disclosure of which is incorporated herein by reference.

The present disclosure relates to a battery module, and more particularly, to a battery module having a structure in which a cell is supported by an outer frame, and a frame assembly therefor.

BACKGROUND ART

In general, battery modules are formed in a structure in which a plurality of cells are assembled by series and/or parallel connection. Such a battery module is illustrated, which typically includes: a cell assembly in which a plurality of cells are arranged and stacked in one direction; and a frame having a plate capable of surrounding the cell assembly.

A battery module of the related art is manufactured in a structure in which a cell assembly 20 is surrounded by a frame 10 formed by an extrusion or die casting method as shown in FIG. 1.

However, such an extrusion or die casting method is a major cause of increasing the unit price of battery modules due to high process costs, and since the expansion of battery modules is forcibly inhibited, the lifespan of cells may be negatively affected.

Alternatively, Korean Patent Application Publication No. 2014-0118734 discloses a battery module including a housing having a side plate, a bottom plate, and a bent portion between the side plate and the bottom plate, and the bent portion is formed such that the side plate and the bottom plate are biased in a direction toward a battery cell.

Korean Patent Application Publication No. 2015-0142790 discloses a battery module in which an upper strap is further included unlike an end plate of the related art so as to prevent a change in the external shape of the battery module caused by a swelling phenomenon.

Although techniques as described above have been proposed, there is a limit to decreasing the weight of battery modules of the related art, and since there is no technical means for stably supporting battery modules and reducing material or process costs while sufficiently allowing the expansion of an end plate caused by swelling, measures are needed.

DISCLOSURE

Technical Problem

The present disclosure is designed by taking problems as described above into consideration, and therefore the present disclosure is directed to providing a battery module having a structure allowing weight reduction by forming a frame using plates made of a material such as a metal sheet, and to providing a frame assembly therefor.

Another object of the present disclosure is to provide a battery module having a structure in which a frame can be formed through a welding process, and a frame assembly therefor.

Technical Solution

The present disclosure is designed by taking problems as described above into consideration, and therefore the present disclosure provides a battery module including: at least one cell; and a frame assembly including a lower plate configured to support a lower end surface of the cell, a strap-shaped side plate perpendicularly extending from four corners of the lower plate and placed adjacent to an outermost side of the cell, and an upper plate coupled to an upper end of the side plate and configured to cover an upper portion of the cell.

Preferably, an end portion of the side plate is bent and welded to an upper surface of the upper plate.

The frame assembly may further include a pair of end plates coupled to both lengthwise ends of the lower plate and the upper plate and to the side plate to support both ends of the cell.

The side plate may be bent from the lower plate in one piece with the lower plate.

In another aspect of the present disclosure, there is provided a frame assembly of a battery module for supporting at least one cell from an outside of the battery module, the frame assembly including: a lower plate configured to support a lower end surface of the cell; a strap-shaped side plate perpendicularly extending from four corners of the lower plate and placed adjacent to an outermost side of the cell; and an upper plate coupled to an upper end of the side plate and configured to cover an upper portion of the cell.

Advantageous Effects

According to the present disclosure, the frame assembly is made of a plate material such as a metal sheet, and the side plate has a strap shape. Therefore, module weight reduction is possible, and since assembling is possible through a welding process, process costs may be reduced.

In addition, even when the battery module swells due to overcharge of the cell, the cell may be stably supported while guaranteeing sufficient expansion of the side plate, and thus the lifespan of the cell may not be negatively affected by a frame.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawings.

BEST MODE

Figure 1:
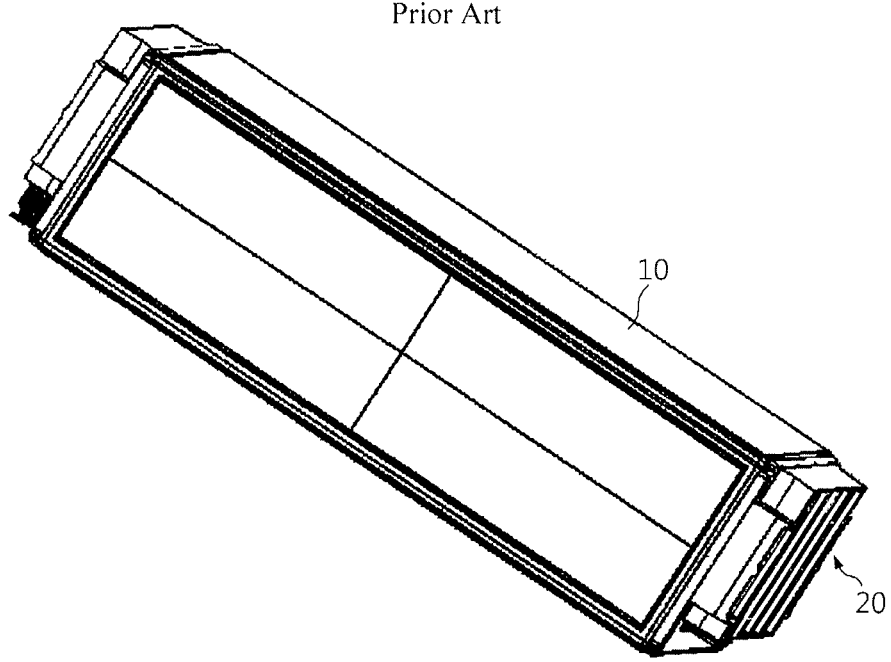
FIG. 1 is a perspective view illustrating an appearance of a battery module of the related art.
Figure 2:
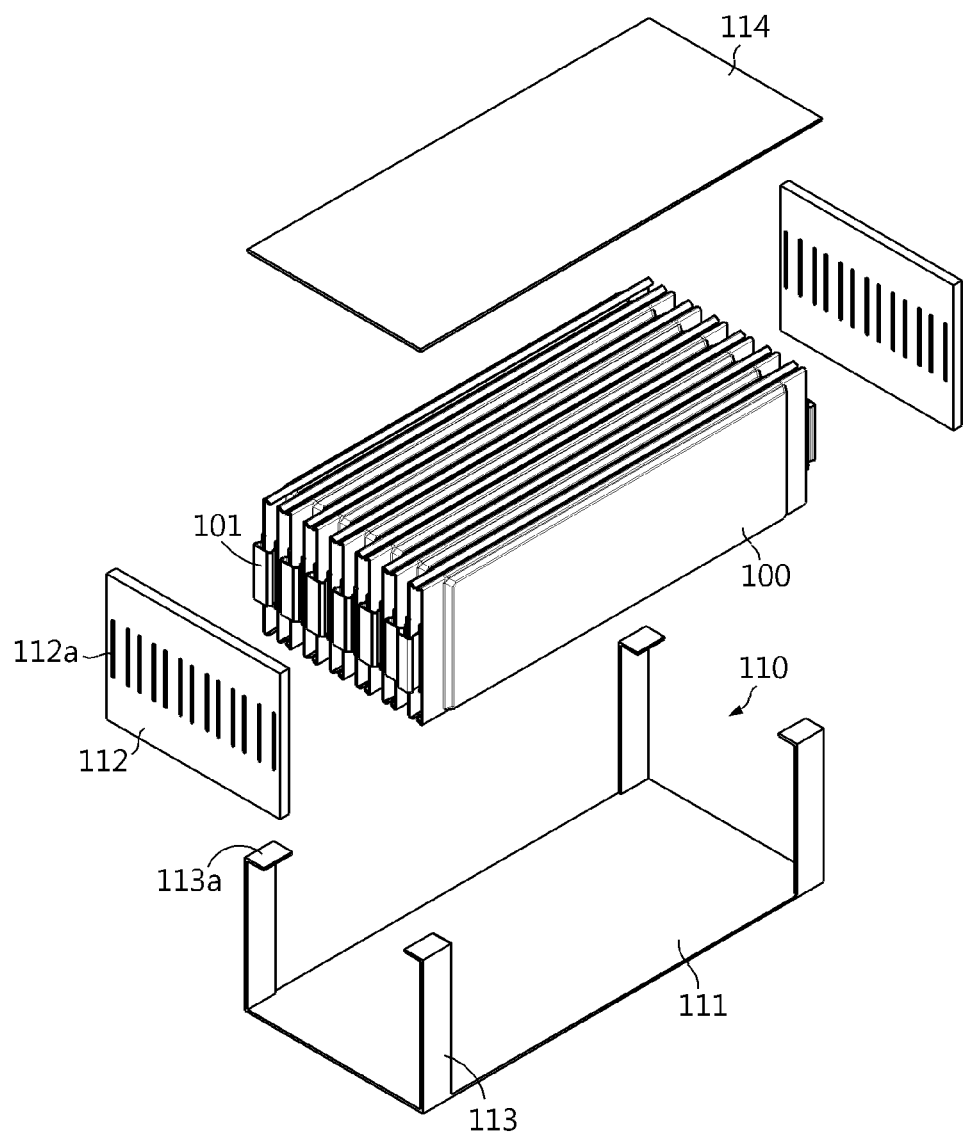
FIG. 2 is an exploded perspective view illustrating a configuration of a battery module according to a preferred embodiment of the present disclosure.

FIG. 2 is an exploded perspective view illustrating a configuration of a battery module according to a preferred embodiment of the present disclosure.

Referring to FIG. 2, according to the preferred embodiment of the present disclosure, the battery module includes: a plurality of cells 100; and a frame assembly 110 arranged to surround the plurality of cells 100 and including a lower plate 111, a strap-shaped side plate 113, and an upper plate 114.

Each of the cells 100 has a thin plate-like body, and preferably includes a pouch-type secondary cell. The plurality of cells 100 are arranged in one direction to substantially form a stacked structure.

The frame assembly 110 is a structure for accommodating, supporting, and protecting the cells 100 in units of a plurality of cells, and the frame assembly 110 includes the lower plate 111 placed below the cells 100, the side plate 113 adjacent to outermost sides of the cells 100, and the upper plate 114 placed above the cells 100. Each of the plates 111, 113, and 114 of the frame assembly 110 is formed of a metal sheet (or a metal plate) such as an aluminum plate having a thin thickness of about several millimeters.

The lower plate 111 has a base surface capable of collectively supporting lower end surfaces of the plurality of cells 100.

The side plate 113 has a strap shape formed by a relatively narrow and long metal sheet and extends perpendicularly upward from four corners of the lower plate 111 in the vicinity of the outermost sides of the cells 100. That is, four side plates 113 corresponding to the four corners of the lower plate 111 are provided, and gaps between the side plates 113 are set such that the plurality of cells 100 may be accommodated.

Preferably, the side plates 113 are bent from end portions of long sides of the lower plate 111 in one piece with the lower plate 111. In addition, preferably, coupling portions 113a are formed by perpendicularly bending lengthwise end portions of the side plates 113 in directions toward the inside of the frame assembly 110 for tight coupling with the upper plate 114.

The upper plate 114 is coupled to upper ends of the side plates 113 to collectively cover upper portions of the plurality of cells 100. Preferably, the upper plate 114 is welded to the respective coupling portions 113a provided on the end portions of the side plates 113. Thus, weld zones (refer to W in FIG. 3) are formed at four points at which the side plates 113 meet the upper plate 114. Here, a welding method such as a laser welding method, an ultrasonic welding method, or a spot welding method may be used.

Figure 3:
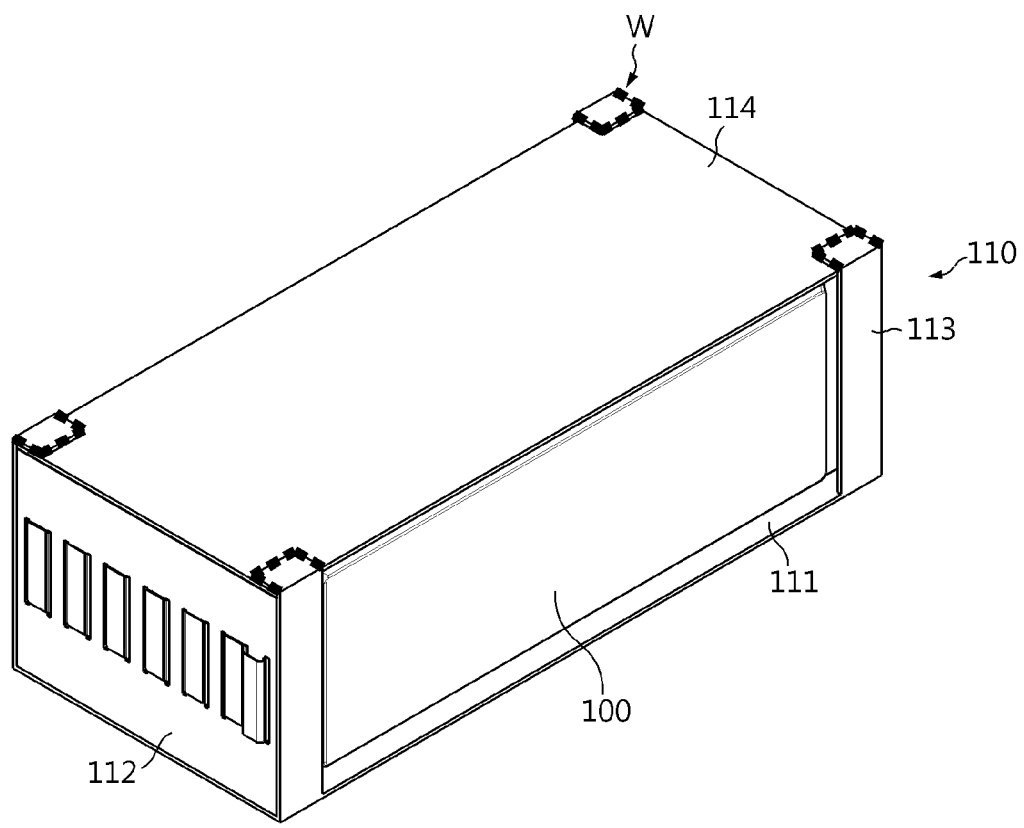
FIG. 3 is an assembled perspective view illustrating the battery module of FIG. 2.

FIG. 3 illustrates a state in which the upper ends of the side plates 113 and the upper plate 114 are assembled by welding. As illustrated in FIG. 3, the battery module including the frame assembly 110 provided in units of a plurality of cells 100 is manufactured by welding the coupling portions 113a of the side plates 113 to four corners of an upper surface of the upper plate 114 in a state in which the plurality of cells 100 are arranged in the frame assembly 110.

A pair of end plates 112 are arranged on both lengthwise ends of the frame assembly 110. The pair of end plates 112 are coupled to both lengthwise ends of the lower plate 111 and the upper plate 114 and to the side plates 113 so as to support both ends of the cells 100. Slits 112a are formed in each of the end plates 112 to pass electrode leads 101 extending from the cells 100 therethrough.

In the battery module having the above-described configuration according to the preferred embodiment of the present disclosure, the frame assembly 110 is assembled in units of a plurality of cells 100.

The frame assembly 110 may be light because the lower plate 111 formed of a metal sheet (or a metal plate) such as an aluminum plate, the side plates 113 having a strap shape, and the upper plate 114 are organically coupled to each other.

When the frame assembly 110 is manufactured, the lower plate 111 and the side plates 113 are formed in one piece through a bending process, and the side plates 113 and the upper plate 114 are coupled to each other by welding. The upper plate 114 is coupled to the side plates 113 through a welding process such as a laser or ultrasonic welding process in a state in which the upper surface of the upper plate 114 overlaps the coupling portions 113a located on the end portions of the side plates 113, and lower surfaces of both lengthwise ends of the upper plate 114 are placed on upper ends of the end plates 112.

INDUSTRIAL APPLICABILITY

The frame assembly manufactured in accordance with the present disclosure may have a lower weight and incur lower assembly process costs than the frames of the related art manufactured by a conventional extrusion or die casting method.

What is claimed is:

1. A battery module comprising:
   at least one cell; and
   a frame assembly comprising:
   a lower plate having four corners and configured to support a lower end surface of the cell, the lower plate having a pair of short sides and a pair of long sides;
   four strap-shaped side plates bent from ends of the long sides of the lower plate and extending perpendicularly from the long sides to face each other across the short sides at the four corners of the lower plate and placed adjacent to an outermost side of the cell;
   an upper plate coupled to an upper end of each of the side plates and configured to cover an upper portion of the cell; and
   a pair of end plates coupled to both lengthwise ends of the lower plate and the upper plate and to a pair of adjacent side plates of the four side plates to support both ends of the cell, wherein each end plate includes a slit to receive an electrode lead of the at least one cell.

2. The battery module of claim 1, wherein an end portion of each side plate is bent and welded to an upper surface of the upper plate.

3. The battery module of claim 1, wherein each side plate is bent from the lower plate in one piece with the lower plate.

4. A frame assembly of a battery module for supporting at least one cell from an outside of the battery module, the frame assembly comprising:
   a lower plate having four corners and configured to support a lower end surface of the cell, the lower plate having a pair of short sides and a pair of long sides;
   four strap-shaped side plates bent from ends of the long sides of the lower plate and extending perpendicularly from the long sides to face each other across the short sides at the four corners of the lower plate and placed adjacent to an outermost side of the cell;
   an upper plate coupled to an upper end of each of the side plates and configured to cover an upper portion of the cell; and
   a pair of end plates coupled to both lengthwise ends of the lower plate and the upper plate and to a pair of adjacent side plates of the four side plates to support both ends of the cell, wherein each end plate includes a slit to receive an electrode lead of the at least one cell.

5. The frame assembly of claim 4, wherein an end portion of each side plate is bent and welded to an upper surface of the upper plate.

6. The frame assembly of claim 4, wherein each side plate is bent from the lower plate in one piece with the lower plate.

\* \* \* \* \*